United States Patent
Kwon et al.

(10) Patent No.: US 8,630,385 B2
(45) Date of Patent: Jan. 14, 2014

(54) EMERGENCY CORE COOLING DUCT FOR EMERGENCY CORE COOLING WATER INJECTION OF A NUCLEAR REACTOR

(75) Inventors: Tae-Soon Kwon, Daejeon (KR); Dong Jin Euh, Daejeon (KR); In-Cheol Chu, Daejeon (KR); Seok Cho, Daejeon (KR); Nam Hyun Choi, Daejeon (KR); Chul-Hwa Song, Daejeon (KR); Won Pil Baek, Daejeon (KR); Jun-Hwa Hong, Daejeon (KR)

(73) Assignees: Korea Atomic Energy Ressearch Institute, Daejeon (KR); Korea Hydro and Nuclear Power Co., Ltd, Seoul (KR)

( * ) Notice: Subject to any disclaimer, the term of this patent is extended or adjusted under 35 U.S.C. 154(b) by 895 days.

(21) Appl. No.: 12/499,824

(22) Filed: Jul. 9, 2009

(65) Prior Publication Data

US 2010/0278294 A1 Nov. 4, 2010

(30) Foreign Application Priority Data

Apr. 29, 2009 (KR) ........................ 10-2009-0037612

(51) Int. Cl.
*G21C 15/18* (2006.01)
*G21C 9/00* (2006.01)
*G21C 15/00* (2006.01)

(52) U.S. Cl.
USPC ........... 376/282; 376/277; 376/347; 376/352; 376/361

(58) Field of Classification Search
USPC ......... 376/282, 277, 347, 352, 361, 395–401, 376/463; 416/95, 96 R
See application file for complete search history.

(56) References Cited

U.S. PATENT DOCUMENTS 3,868,302 A * 2/1975 Singleton .................... 376/289
4,187,147 A 2/1980 Braun et al.
5,000,907 A 3/1991 Framatome
7,809,099 B2 * 10/2010 Kwon et al. .................. 376/282
7,983,377 B2 * 7/2011 Kwon et al. .................. 376/352
8,064,564 B2 * 11/2011 Singleton ..................... 376/287

FOREIGN PATENT DOCUMENTS

| DE | 4032032 A1 | 4/1991 |
|---|---|---|
| KR | 10-0128664 | 11/1997 |
| KR | 10-2000-0074521 | 12/2000 |
| KR | 2000-0074521 | 12/2000 |
| KR | 10-2005-0022413 | 3/2005 |
| KR | 10-0525708 | 10/2005 |

OTHER PUBLICATIONS

Office Action issued by the Korean Intellectual Property Office on Jan. 6, 2011 for a corresponding Korean Patent Application No. 10-2009-0037612.

* cited by examiner

*Primary Examiner* — Bernarr Gregory
(74) *Attorney, Agent, or Firm* — Soroker-Agmon

(57) ABSTRACT

The present invention relates to a longitudinally divided emergency core cooling (ECC) duct in order to efficiently inject safety water to core of a pressurized light-water nuclear reactor. The ECC duct includes side supports for preventing the flow-induced vibration in the annular downcomer, and has structural stability while thermally expanding and contracting. A longitudinally divided ECC duct for emergency core cooling water injection of a nuclear reactor is provided on the periphery of a core barrel of a nuclear reactor, includes an emergency core cooling water inlet facing a direct vessel injection nozzle, and extends in a longitudinal direction of the core barrel. The longitudinally divided ECC duct is divided into a plurality of longitudinally-divided ducts in the longitudinal direction of the longitudinally divided ECC duct.

8 Claims, 6 Drawing Sheets

100

130

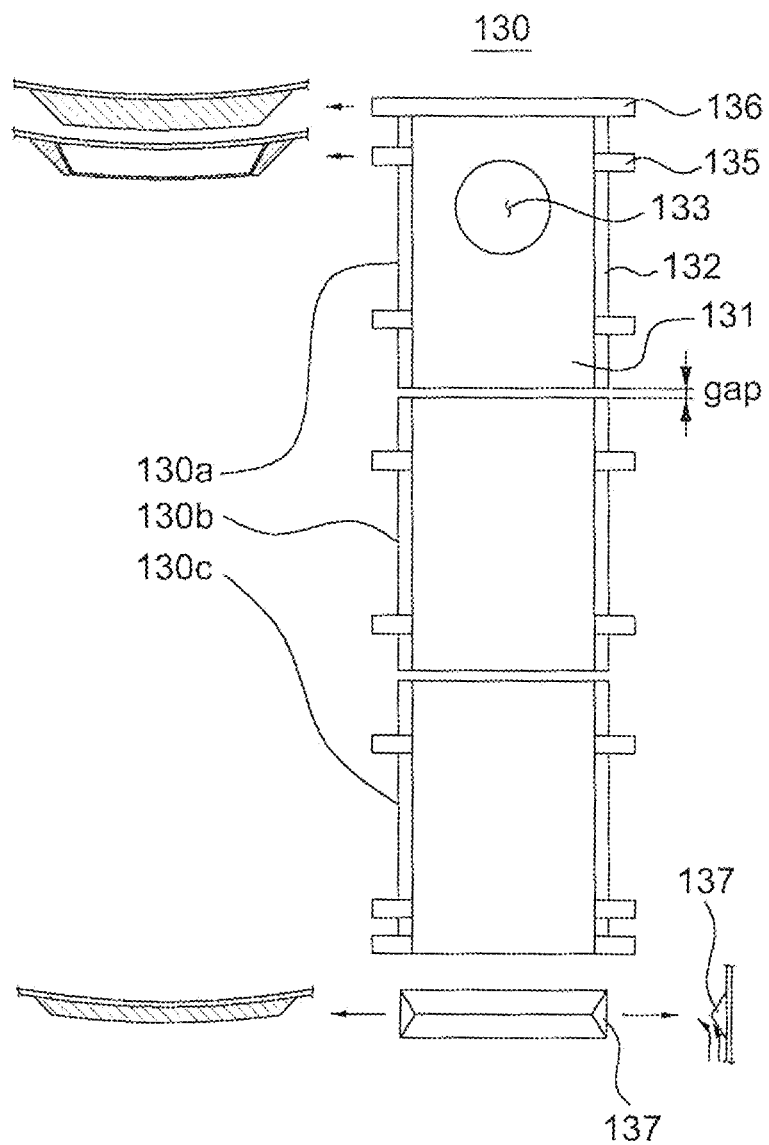

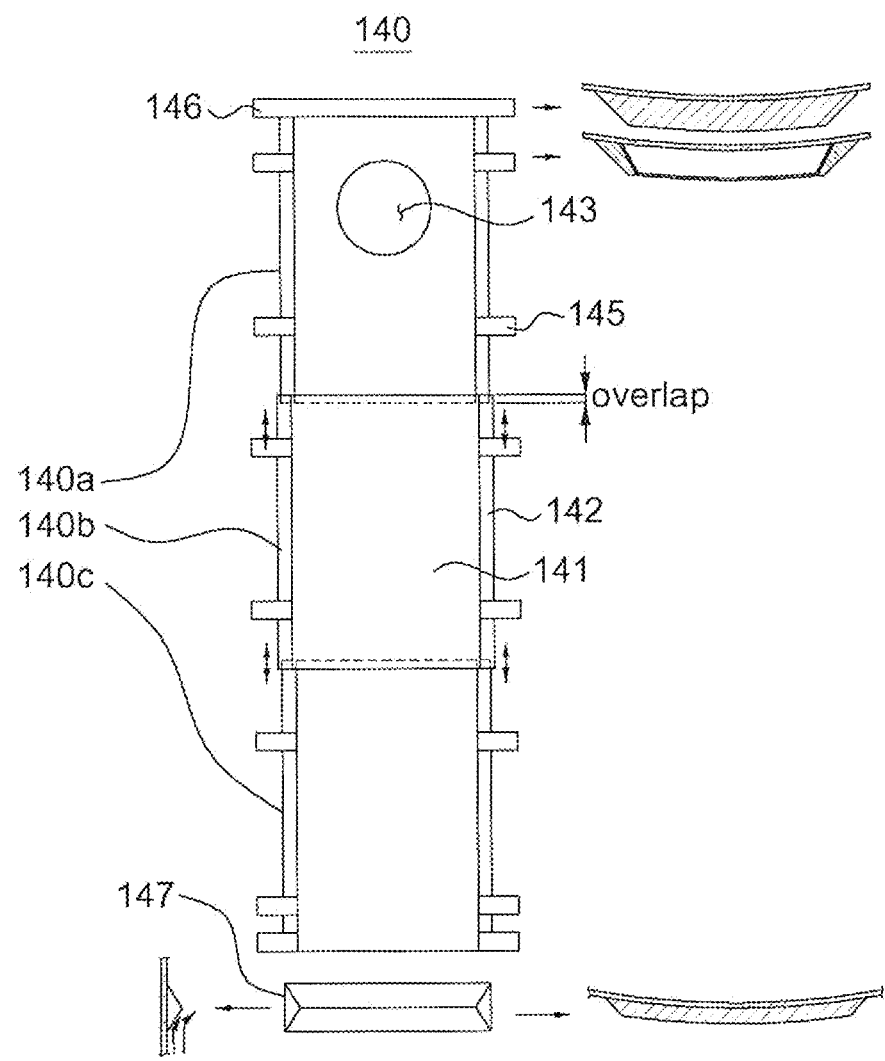

EMERGENCY CORE COOLING DUCT FOR EMERGENCY CORE COOLING WATER INJECTION OF A NUCLEAR REACTOR

CROSS-REFERENCE TO RELATED APPLICATION

This application claims priority from Korean Patent Application No. 10-2009-0037612, filed on Apr. 29, 2009, in the Korean Intellectual Property Office, the entire disclosure of which is incorporated herein by reference.

BACKGROUND OF THE INVENTION

1. Technical Field

The present invention relates to a cooling duct that directly injects emergency core cooling water which is supplied from a high-pressure safety injection pump or a safety injection tank, to a downcomer, which is formed by a reactor pressure vessel and a core barrel in a pressurized light-water nuclear reactor. In particular, the present invention relates to a longitudinally divided emergency core cooling (ECC) duct for an emergency core cooling water injection that includes side supports for the cooling duct, has structural stability while thermally expanding and contracting, and is divided into a plurality of longitudinally-divided ducts in the longitudinal direction of the cooling duct.

2. Related Art

A pressurized light-water nuclear reactor is designed with consideration for a sufficient safety factor, but accidents could happen contrary to expectations. If the emergency core cooling water is not sufficiently supplied to the nuclear reactor during an accident (for example, the leakage of a large amount of cooling water), a core of the nuclear reactor could get overheated so that the nuclear reactor may get damaged. The pressurized light-water nuclear reactor is provided with the high-pressure safety injection pumps and safety injection tanks so that the emergency core cooling water is supplied to the nuclear reactor from the outside to cool the core when the accident (for example, a loss of coolant) occurs. The methods of supplying emergency core cooling water are classified into a cold leg-injection method that uses an injection nozzle positioned at a cold leg and a direct injection method that uses an injection nozzle positioned at a reactor pressure vessel.

The cold leg-injection method has a problem in that all emergency core cooling water leaks through a fractured portion when the cold leg is fractured, which causes the effectiveness of the cooling of the core of the nuclear reactor to deteriorate. In order to solve the problem of the cold leg-injection method, there has been employed an improved injection method that provides a direct vessel injection (DVI) nozzle for directly supplying the emergency core cooling water to a downcomer between the reactor pressure vessel and a core barrel by using a direct vessel injection nozzle, thereby preventing the emergency core cooling water through a cold leg.

However, the direct injection method also has a problem in that emergency core cooling water is directly discharged to the outside of the reactor pressure vessel due to the strong cross-flow in the downcomer, which causes a flow of the injected emergency cooling water toward the broken cold leg bypassing the core. In order to solve this problem, there has been proposed a method disclosed in U.S. Pat. No. 5,377,242 (James D. Carlton et. al) where a direct vessel injection nozzle merely extends to a core inlet: a method disclosed in U.S. Pat. No. 5,135,708 (James D. Carlton et al.), and Korean Patent Application publication No. 2000-0074521 (Hanlim. Choi et al.) where a narrow gap is formed between a direct vessel injection nozzle and a cooling duct and a cooling duct merely extends toward the lower side of a downcomer. In these cases, when a pipe of the direct vessel injection nozzle is fractured, the lowermost end outlet of the cooling duct is reversed as an inlet for fracture flow so that the level of the cooling water in the nuclear reactor is constantly lowered and reaches the lowermost end outlet of the cooling duct or below. If the level of the cooling water is lowered as described above, the core of the nuclear reactor is exposed, which may result in fatalities.

According to a technique concerning a pipe, which injects emergency core cooling water, of "safety injection system including extension duct for core barrel (Taesoon. Kwon et al., Korean Patent Application No. 2008-0024306)", since the bearing resistance, which is born against strong cross-flow in a downcomer by a cooling duct, is weak, the pipe is structurally weak. Further, when a nuclear reactor starts at a low temperature and is heated to a high-temperature output condition, the pipe is weakened against a thermal stress at the welded portions of the structures. In particular, as the length of the cooling duct is increased, the pipe becomes structurally weaker against the thermal stress that is caused by thermal expansion and contraction.

There is a demand for an emergency core cooling (ECC) duct for emergency core cooling water injection that can prevent reversal of water levels at the inlet and outlet when an accident (for example, the fracture of a direct injection pipe) occurs, has sufficient structural durability to bear a strong cross-flow in a downcomer, and suppresses the thermal stress that is generated at a welded portion of an injection duct until a nuclear reactor reaches a high temperature after starting at low temperature, and can prevent an excessive load of backflow that is applied to the ECC duct during an initial core backflow when a large cold leg is fractured.

SUMMARY OF THE INVENTION

An aspect of the present invention provides an emergency core cooling (ECC) duct for the emergency core cooling water injection of a nuclear reactor that can suppress the occurrence of flow-induced vibration by a cooling duct and has structural stability while thermally expanding and contracting.

Another aspect of the present invention also provides a longitudinally divided ECC duct for emergency core cooling water injection of a nuclear reactor that can prevent an excessive load of backflow applied to the longitudinally divided ECC duct in the period of initial core backflow when a large cold leg is fractured.

According to an aspect of the present invention, there is provided a longitudinally divided emergency core cooling (ECC) duct for the emergency core cooling water injection of a nuclear reactor. The longitudinally divided ECC duct is provided on a periphery of a core barrel of the nuclear reactor at a position facing a direct vessel injection nozzle, and extends in a longitudinal direction of the core barrel. The longitudinally divided ECC duct is formed of a plurality of longitudinally-divided ducts divided in the longitudinal direction.

In the embodiments, the longitudinally divided ECC duct is divided in the longitudinal direction in order to disperse longitudinal thermal stress caused by thermal expansion and contraction that is increased due to the increase of the length of the longitudinally divided ECC duct. Accordingly, a gap may be formed between adjacent longitudinally-divided ducts, or a part of adjacent longitudinally-divided ducts may partially overlap each other. If the longitudinally divided ECC duct is formed so that the longitudinally-divided ducts overlap each other, the longitudinally-divided ducts of the longitudinally divided ECC duct may move and slide relative to one another in the longitudinal direction as the longitudinally-divided ducts expand or contract due to heat.

For example, the longitudinally divided ECC duct has a U-shaped cross section so as to have a substantially trapezoidal cross section with respect to the surface of the core barrel, and the side surfaces of the longitudinally divided ECC duct form slopes. A space, which is surrounded by the longitudinally divided ECC duct and the surface of the core barrel, forms a flow passage for the emergency core cooling water through which the emergency core cooling water is injected into the nuclear reactor.

In the embodiments, the longitudinally divided ECC duct may further include a plurality of side supports, which are provided at regular intervals and fixes the longitudinally divided ECC duct, so as to bear the strong cross-flow in the downcomer.

The side supports may be provided at regular intervals in the longitudinal direction of the longitudinally divided ECC duct.

Further, an inlet, through which the emergency core cooling water is injected into the longitudinally divided ECC duct, may be formed on an upper surface of the longitudinally divided ECC duct. The upper surface may be gently curved and convex with respect to a surface of the core barrel.

In the embodiments, an upper end of the gently curved and convex duct may be closed and a lower end of the longitudinally divided ECC duct may be opened. An outlet guide, which changes a direction of the backflow when a sudden backflow is generated from a core of the nuclear reactor toward the longitudinally divided ECC duct, may be provided near the lower end of the longitudinally divided ECC duct. The outlet guide may protrude from the surface of the core barrel, and reduces the flow resistance that is generated when a high-speed backward fracture flow generated before the emergency core cooling water is injected into the nuclear reactor is injected into the longitudinally divided ECC duct, thereby, improving the safety of the longitudinally divided ECC duct.

According to the embodiments of the present invention, since the longitudinally divided ECC duct having a U-shaped cross section without a bottom is fixed to the core barrel by the side supports as described above, it may be possible to more firmly fix the longitudinally divided ECC duct to the core barrel. Accordingly, it may be possible to further improve the structural stability of the longitudinally divided ECC duct against the high-speed cross-flow, which is generated in the downcomer, in comparison with a simple cooling duct in the related art.

Further, the cooling duct is divided into the plurality of longitudinally-divided ducts. A gap or overlap, which copes with the length corresponding to thermal expansion and contraction, is formed between the longitudinally-divided ducts, so that the longitudinally-divided ducts can move and slide relative to one another during the thermal expansion or contraction of the cooling duct. Since a much smaller thermal stress is applied to the longitudinally-divided ducts in comparison with the thermal stress applied to a long cooling duct, the cooling duct has structural stability. The reason for this is that the thermal stress of a long cooling duct is dispersed by the longitudinally-divided ducts.

BRIEF DESCRIPTION OF THE DRAWINGS

FIG. 5 is a front view of the cool duct shown in FIG. 3.

FIG. 6 is a front view of a longitudinally divided ECC duct according to another embodiment of the present invention.

DESCRIPTION OF EXEMPLARY EMBODIMENTS

Figure 1:
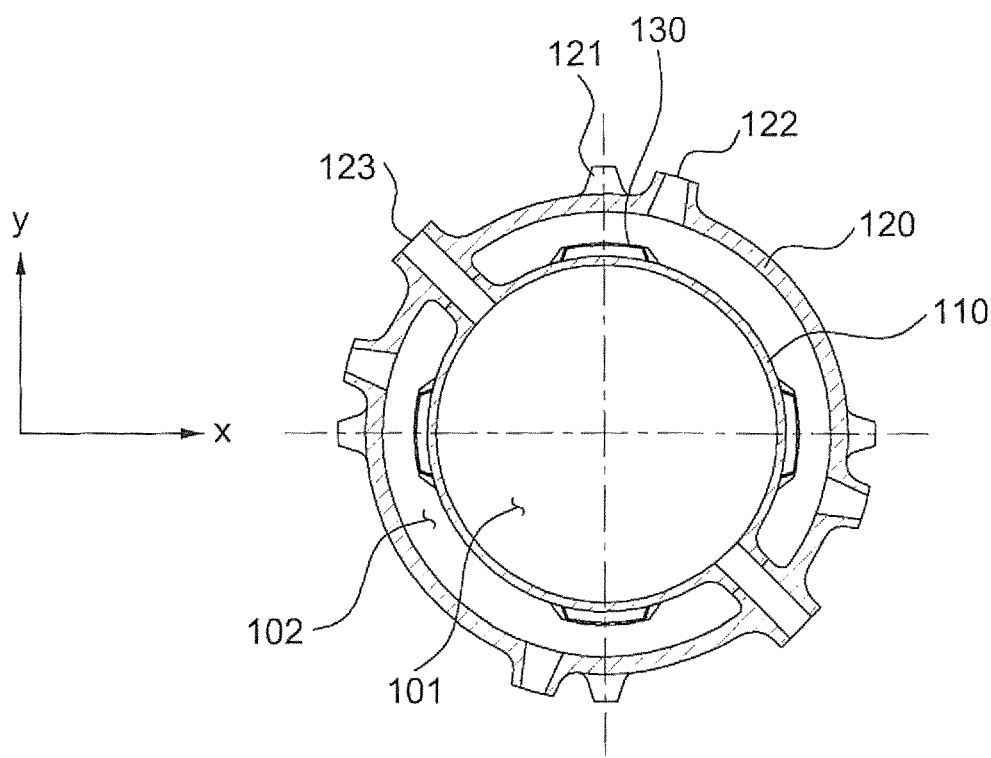
FIG. 1 is a cross-sectional view of an example of a nuclear reactor that includes longitudinally divided emergency core cooling (ECC) ducts for the emergency core cooling water injection according to an embodiment of the present invention.
Figure 2:
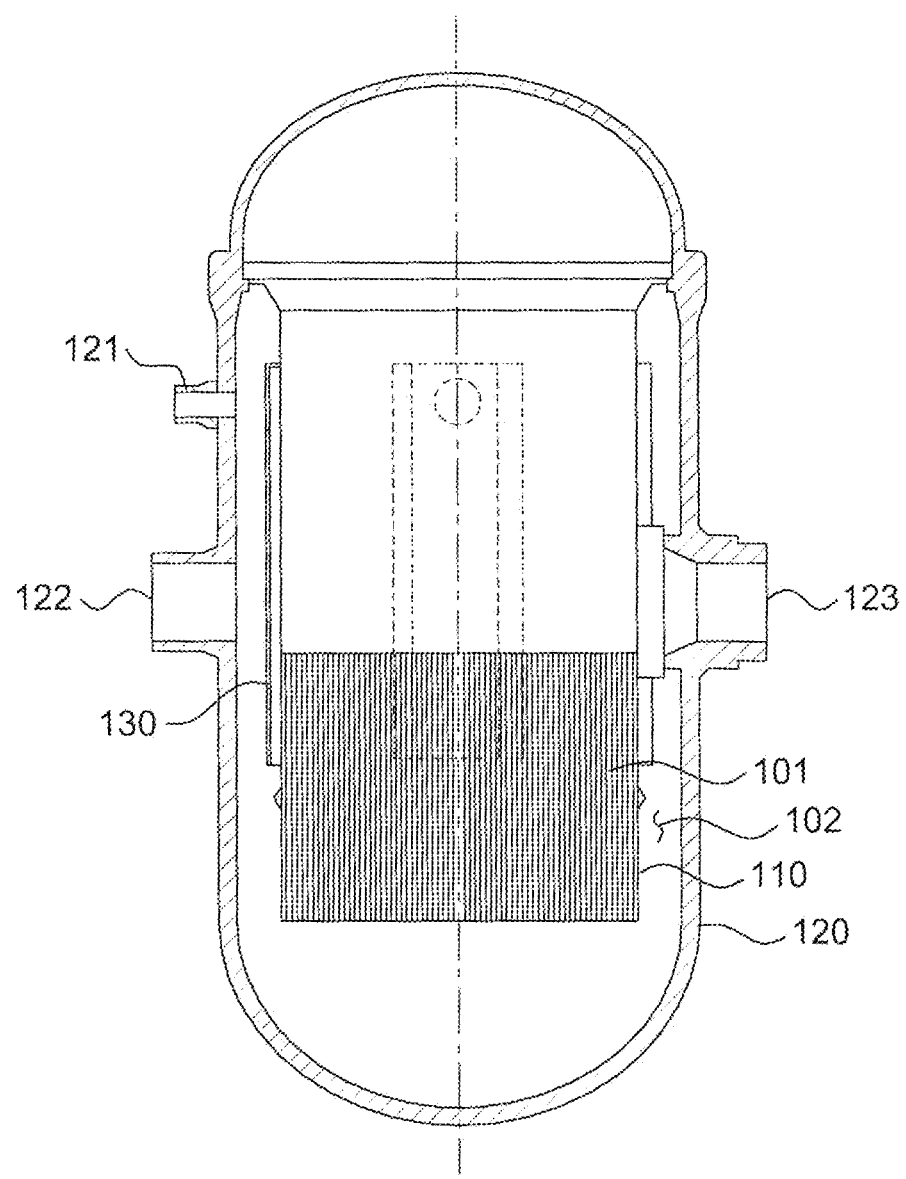
FIG. 2 is a longitudinal cross-sectional view of the nuclear reactor shown in FIG. 1.

Reference will now be made in detail to embodiments of the present invention, examples of which are illustrated in the accompanying drawings, wherein like reference numerals refer to the like elements throughout. The embodiments are described below in order to explain the present invention by referring to the figures.

A longitudinally divided emergency core cooling (ECC) duct for emergency core cooling water injection of a nuclear reactor according to an embodiment of the present invention will be described in detail below with reference to FIGS. 1 to 5.

A pressurized light-water nuclear reactor 100 mainly includes a reactor pressure vessel 120, and a core barrel 110 that is provided in the reactor pressure vessel 120 and receives a core 101. A core 101 into which nuclear fuel rods are charged is provided in the core barrel 110, a diameter of the core barrel 110 is smaller than a diameter of the reactor pressure vessel 120 by a predetermined amount, and a space between the core barrel 110 and the reactor pressure vessel 120 functions as a downcomer 102.

In the nuclear reactor 100, emergency core cooling water is directly injected to the reactor pressure vessel 120. The nuclear reactor is provided with a direct vessel injection nozzle 121, a plurality of cold legs 122, and a plurality of hot legs 123. The direct vessel injection nozzle 121 and the plurality of cold legs 122 are provided on one side of the reactor pressure vessel 120. Emergency core cooling water is injected into the nuclear reactor through the direct vessel injection nozzle 121, and cooling water is injected into the nuclear reactor through the plurality of cold legs 122 during the normal operation of the nuclear reactor 100. The plurality of hot legs 123 is connected to the core barrel 110, and function as outlets. The cooling water, which flows into the nuclear reactor through the plurality of cold legs 122 and is heated while passing by the core 101 through the downcomer 102, flows toward a steam generator through the outlets. For example, the nuclear reactor 100 may be provided with four cold legs 122 and two hot legs 123. Since a detailed structure of the nuclear reactor 100 may be understood from well-known arts and is not a main point of the present invention, detailed descriptions and drawings of the nuclear reactor will be omitted herein.

Longitudinally divided ECC ducts 130, which function as flow passages through which the emergency core cooling water injected from the direct vessel injection nozzle 121 flows, are provided in the downcomer 102. For example, each of the longitudinally divided ECC ducts 130 extends in the longitudinal direction of the core barrel 110, and four longitudinally divided ECC ducts 130 are provided on the periphery of the core barrel 110. However, a shape of the longitudinally divided ECC duct 130 is not limited to the shape shown in the drawings. A length, a position, and a number of the longitudinally divided ECC duct 130 may be substantially and variously changed. According to the present embodiment, the direct vessel injection nozzle 121 and the longitudinally divided ECC duct 130 are not mechanically connected to each other. Accordingly, it may be possible to prevent the longitudinally divided ECC duct 130 from interfering with peripheral structures during assembly and disassembly of the reactor pressure vessel 120 and the core barrel 110.

The longitudinally divided ECC duct 130 is formed at a position facing the direct vessel injection nozzle 121, so that the emergency core cooling water injected from the direct vessel injection nozzle 121 is directly injected to the longitudinally divided ECC duct. A flow passage, through which the emergency core cooling water flows, is formed in the longitudinally divided ECC duct. The longitudinally divided ECC duct 130 is formed of a plurality of longitudinally-divided ducts 130a, 130b, and 130c that are divided in the longitudinal direction of the longitudinally divided ECC duct 130. An upper cover plate 136 is provided at an upper end of the longitudinally divided ECC duct, so that the emergency core cooling water injected from the direct vessel injection nozzle 121 flows to the lower portion of the longitudinally divided ECC duct 130. Accordingly, the upper end of the longitudinally divided ECC duct 130 is closed and the lower end, thereof, is opened.

Further, a cavity is formed in the longitudinally divided ECC duct 130 so that the flow passage, through which the emergency core cooling water flows, is formed in the longitudinally divided ECC duct. A side of the longitudinally divided ECC duct coming in contact with the core barrel 110 is opened so that the longitudinally divided ECC duct has a U-shaped cross section. That is, a space, which is surrounded by three sides of the longitudinally divided ECC duct 130 and the surface of the core barrel 110, forms the flow passage through which the emergency core cooling water flows. In this case, since the longitudinally divided ECC duct 130 has a U-shaped cross section without a bottom, the contact area between the longitudinally divided ECC duct 130 and the core barrel 110 is reduced. Accordingly, it may be possible to suppress the flow-induced vibration that is generated in the contact surface between the longitudinally divided ECC duct 130 and the core barrel 110.

Furthermore, the upper surface 131 of the longitudinally divided ECC duct 130 has the shape of a predetermined convex curved surface. Since the upper surface 131 of the longitudinally divided ECC duct 130 is formed of a curved surface, the longitudinally divided ECC duct allows for thermal expansion when the longitudinally divided ECC duct 130 thermally expands. Therefore, the longitudinally divided ECC duct 130 may be prevented from becoming twisted and may have structural stability.

Figure 4:
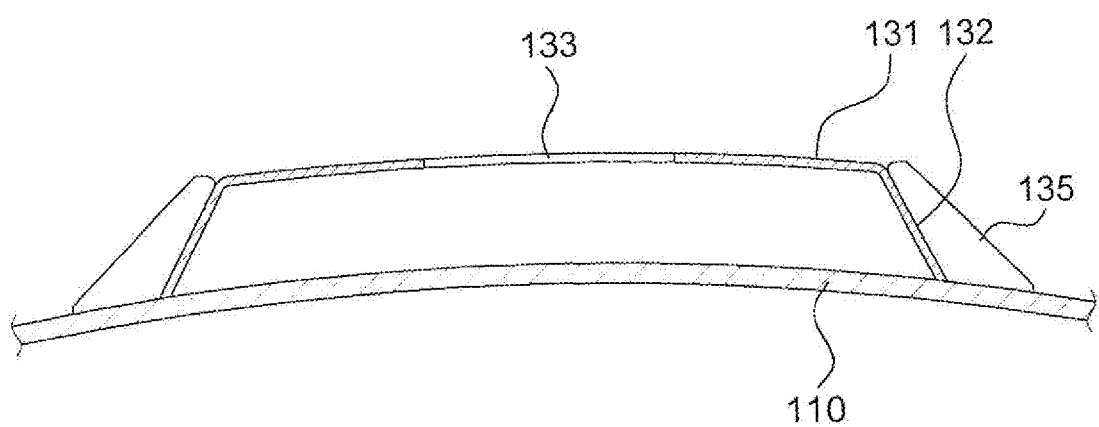
FIG. 4 is a longitudinal cross-sectional view of the ECC duct shown in FIG. 3.

An inlet 133, into which the emergency core cooling water injected from the direct vessel injection nozzle 121 is injected, is formed on the upper surface 131 of the longitudinally divided ECC duct 130 at a position facing the direct vessel injection nozzle 121. Further, side slopes 132 are formed at side surfaces of the longitudinally divided ECC duct 130, so as to decrease the resistance that is caused by the cross-flow in the downcomer 102. That is, the longitudinally divided ECC duct includes the convex upper surface 131 and the side slopes 132 as shown in FIG. 4, so that the longitudinally divided ECC duct 130 has a substantially trapezoidal cross section.

In this case, the cross-sectional area of the inlet 133 of the longitudinally divided ECC duct 130 is about two or three times larger than that of the direct vessel injection nozzle 121 so that the emergency core cooling water flows into the inlet well based on dispersion of the emergency core cooling water that is injected from the direct vessel injection nozzle 121.

The longitudinally divided ECC duct 130 protrudes from the surface of the core barrel 110 toward the reactor pressure vessel 120 by a predetermined height. The height of the longitudinally divided ECC duct 130 is limited to be within a gap of the downcomer 102, that is, the distance between the core barrel and the reactor pressure vessel. Specifically, the longitudinally divided ECC duct has a height in the range of $3/25$ to $7/25$ of the gap of the downcomer 102, that is, the distance between the outer peripheral surface of the core barrel 110 and the inner peripheral surface of the reactor pressure vessel 120, so that the longitudinally divided ECC duct 130 does not cause interference during the assembly and disassembly of the reactor pressure vessel 120 and the core barrel 110.

The longitudinally divided ECC duct 130 extends in the longitudinal direction of the core barrel 110 from a position facing the direct vessel injection nozzle 121 to lower sides of the plurality of cold legs 122 and the plurality of hot legs 123. That is, the longitudinally divided ECC duct 130 extends in the longitudinal direction of the core barrel 110 up to a position that is slightly above the position facing the direct vessel injection nozzle 121, so that the emergency core cooling water injected from the direct vessel injection nozzle 121 is injected into the longitudinally divided ECC duct. Further, the longitudinally divided ECC duct supplies the emergency core cooling water to the lower portion of the downcomer 102. Furthermore, an outlet of the longitudinally divided ECC duct 130 is positioned below the position of the plurality of cold legs 122 based on the leakage of the emergency core cooling water that is caused by the strong fracture flow generated around the plurality of cold legs 122 during an accident.

A plurality of side supports 135 for fixing the longitudinally divided ECC duct 130 is provided on side surfaces of the longitudinally divided ECC duct 130. The plurality of side supports 135 is disposed at regular intervals in the longitudinal direction of the longitudinally divided ECC duct 130.

Figure 3:
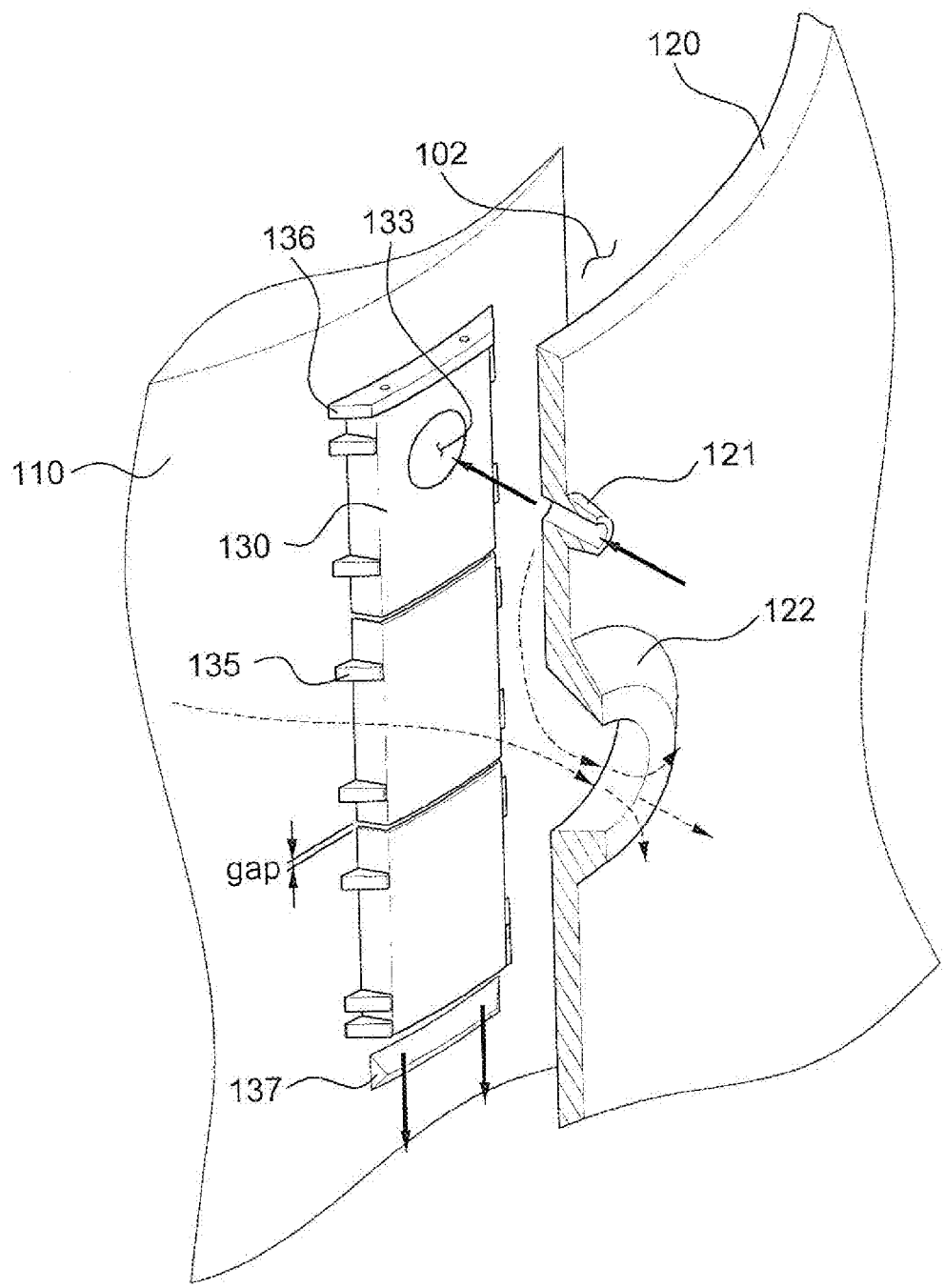
FIG. 3 is a perspective view of main parts of the longitudinally divided ECC duct for emergency core cooling water injection in the nuclear reactor of FIG. 1.

An outlet guide 137 is provided near the lower end of the longitudinally divided ECC duct 130. When sudden backflow is generated from the core 101 of the nuclear reactor 100 toward the longitudinally divided ECC duct 130, the outlet guide changes a direction of the backflow. The outlet guide 137 is formed so as to reduce flow resistance, which is generated when a high-speed backward fracture flow generated before the emergency core cooling water is injected into the nuclear reactor 100 flows into the longitudinally divided ECC duct 130. For example, the outlet guide 137 protrudes from a surface of the core barrel 110 by a predetermined height, and forms predetermined slopes with respect to the direction of the backflow against the longitudinally divided ECC duct 130. Further, the outlet guide forms slopes so as to reduce the resistance in a direction of the flow of the emergency core cooling water that flows through the longitudinally divided ECC duct 130. For example, the outlet guide 137 may have a shape of a pyramid as shown in FIG. 3. However, the present invention is not limited to the drawings, and the shape and position of the outlet guide 137 may be substantially and variously changed.

The longitudinally-divided ducts 130a, 130b, and 130c may be formed, so as to move and slide relative to one another in the longitudinal direction of the longitudinally divided ECC duct as the longitudinally divided ECC duct 130 expands or contracts due to heat.

For example, as shown in FIG. 5, predetermined gaps may be formed between adjacent longitudinally-divided ducts 130a, 130b, and 130c of the longitudinally divided ECC duct 130.

The longitudinally divided ECC duct 130 is divided into three longitudinally-divided ducts 130a, 130b, and 130c, and the gaps are formed between the longitudinally-divided ducts 130a, 130b, and 130c. Accordingly, the longitudinally divided ECC duct allows for thermal expansion so that the longitudinally-divided ducts 130a, 130b, and 130c expand and move along the gaps during the thermal expansion of the longitudinally divided ECC duct 130. Therefore, it may be possible to prevent twisting and deformations of the longitudinally divided ECC duct 130 that are caused by the thermal expansion of the longitudinally divided ECC duct. Likewise, the longitudinally-divided ducts 130a, 130b, and 130c contract even during the contraction of the longitudinally divided ECC duct 130, so that the gaps are increased. Accordingly, it may be possible to prevent the twisting and deformation of the longitudinally divided ECC duct 130 that are caused by the contraction of the longitudinally divided ECC duct 130.

Also, according to another embodiment, longitudinally-divided ducts 140a, 140b, and 140c of a longitudinally divided ECC duct 140 may partially overlap each other as shown in FIG. 6. The longitudinally divided ECC duct 140 shown in FIG. 6 is substantially the same as the longitudinally divided ECC duct according to the above-described embodiment except that the longitudinally-divided ducts 140a, 140b, and 140c partially overlap each other. Accordingly, the same name is given to the same components, the components will be denoted by reference numerals in the range of 140 to 149, and repeated descriptions thereof will be omitted.

Like the longitudinally divided ECC duct 130 according to the above-described embodiment, the longitudinally divided ECC duct 140 is formed of a plurality of longitudinally-divided ducts 140a, 140b, and 140c that is divided in the longitudinal direction of the longitudinally divided ECC duct 140. An upper cover plate 146 is provided at the upper end of the longitudinally divided ECC duct so that the injected emergency core cooling water flows to the lower portion of the longitudinally divided ECC duct 140. Accordingly, the upper end of the longitudinally divided ECC duct 140 is closed and the lower end thereof is opened.

Further, an outlet guide 137 is provided near the lower end of the longitudinally divided ECC duct 130. An outlet guide 147 for preventing backflow is provided near the lower end of the longitudinally divided ECC duct 140.

Furthermore, the longitudinally divided ECC duct 140 includes an upper surface 141 having a shape of a predetermined convex curved surface and side slopes 142, so as to reduce the resistance that is caused by the cross-flow in the downcomer 102. In addition. an inlet 143, into which the emergency core cooling water injected from the direct vessel injection nozzle 121 is injected, is formed on the upper surface of the longitudinally divided ECC duct 140, and the longitudinally divided ECC duct 140 has a substantially trapezoidal cross section. Longitudinally divided FCC duct 140 also is provided with a plurality of side supports 145 on the side surfaces of longitudinally divided ECC duct 140. similar to side supports 135 provided for longitudinally divided ECC duct 130.

The longitudinally divided ECC duct 140 is divided into three longitudinally-divided ducts 140a, 140b, and 140c. The longitudinally-divided ducts 140a, 140b, and 140c partially overlap with each other, thereby forming overlaps there between. The longitudinally-divided ducts 140a, 140b, and 140c may move and slide relative to one another at the overlaps. That is, the longitudinally-divided ducts 140a, 140b, and 140c move and slide relative to one another through the overlaps during the thermal expansion of the longitudinally divided ECC duct 140. Accordingly, it may be possible to prevent the twisting and deformation of the longitudinally divided ECC duct that are caused by the thermal expansion of the longitudinally divided ECC duct. Likewise, even though contracting during the contraction of the longitudinally divided ECC duct 140, the longitudinally-divided ducts 140a, 140b, and 140c allows for the contraction at the overlaps. Accordingly, it may be possible to prevent the twisting and deformation of the longitudinally divided ECC duct 140 that are caused by the contraction of the longitudinally divided ECC duct.

According to the embodiments, the direct vessel injection nozzle 121 and the longitudinally divided ECC ducts 130 and 140 may not be mechanically connected to each other. However, since the emergency core cooling water injected from the direct vessel injection nozzle 121 directly flows into the inlet 133 or 143 due to the injection pressure thereof, the direct vessel injection nozzle and the longitudinally divided ECC duct are thermally and hydraulically connected to each other. That is, when the nuclear reactor 100 is normally operated, emergency core cooling water is not supplied to the longitudinally divided ECC ducts 130 and 140 from the direct vessel injection nozzle 121. Accordingly, the direct vessel injection nozzle 121 and the longitudinally divided ECC ducts 130 and 140 are thermally and hydraulically isolated from each other. However, when an accident (for example, a fracture of the plurality of cold legs 122) occurs, emergency core cooling water is injected into the longitudinally divided ECC ducts 130 and 140 from the direct vessel injection nozzle 121. Since the direct vessel injection nozzle 121 injects the emergency core cooling water at high speed in this case, the emergency core cooling water may be sufficiently injected into the inlets 133 and 143 of the longitudinally divided ECC ducts 130 and 140 from the direct vessel injection nozzle 121 across the downcomer 102.

Also, a part. of the emergency core cooling water, which is injected from the direct vessel injection nozzle 121, may fall down or leak to the outside through the gaps between the longitudinally-divided ducts 130a, 130b, and 130c without being injected into the inlet 133 or 143. However, the emergency core cooling water is collected at the lower portion of the downcomer 102 due to gravity and may be used to cool the core 101.

The emergency core cooling water, which is injected into the longitudinally divided ECC duct 130 or 140, cools the core 101 while flowing down along the longitudinally divided ECC duct 130 or 140 due to gravity and the flow momentum of the emergency core cooling water. Further, since the emergency core cooling water flows into the longitudinally divided ECC duct 130 or 140, it may be possible to prevent the emergency core cooling water from being directly discharged to the outside of the reactor pressure vessel 120 through the plurality of cold legs 122, that is, the direct bypass discharge of the emergency core cooling water by the high-speed cross-flow generated in the downcomer 102.

Furthermore, according to the embodiments, since the emergency core cooling water is not injected from the injection nozzle 121 when an accident (for example, the fracture of a pipe connected to the direct vessel injection nozzle 121) occurs, the direct vessel injection nozzle 121 is isolated from the longitudinally divided ECC ducts 130 and 140 and the cooling water collected at the lower portion of the downcomer 102 is sucked through the longitudinally divided ECC ducts 130 and 140. Accordingly, it may be possible to prevent the lowering of the level of the cooling water in the reactor pressure vessel 120, that is, the reverse of the water levels at the inlet and outlet.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A longitudinally divided emergency core cooling (ECC) duct for emergency core cooling water injection to a nuclear reactor, the longitudinally divided ECC duct configured to be provided on a periphery of a core barrel of the nuclear reactor, the longitudinally divided ECC duct including an emergency core cooling water inlet configured to face a direct vessel injection nozzle, and configured to extend in a longitudinal direction of the core barrel, wherein the longitudinally divided ECC duct is formed of a plurality of longitudinally-divided ducts divided in the longitudinal direction;

wherein the longitudinally divided ECC duct includes an upper surface with side slopes configured to form a flow passage for the emergency core cooling water injected from the direct vessel injection nozzle; and wherein a plurality of side supports extend outward from the side slopes of the longitudinally divided ECC duct to affix the longitudinally divided ECC duct to the periphery of the core barrel.

2. The longitudinally divided ECC duct according to claim 1, wherein a gap is formed between adjacent longitudinally-divided ducts of the longitudinally divided ECC duct.

3. The longitudinally divided ECC duct according to claim 2, wherein the longitudinally-divided ducts of the longitudinally divided ECC duct move and slide relative to one another in the longitudinal direction due to thermal expansion and/or shrinkage.

4. The longitudinally divided ECC duct according to claim 1, wherein the plurality of side supports are provided at intervals in the longitudinal direction of ECC duct.

5. The longitudinally divided ECC duct according to claim 4, wherein the inlet, through which emergency core cooling water is injected into the longitudinally divided ECC duct, is formed on the upper surface of the longitudinally divided ECC duct, and the upper surface is gently curved and convex with respect to a surface of the core barrel.

6. The longitudinally divided ECC duct according to claim 4, wherein an upper end of the longitudinally divided ECC duct is closed and a lower end of the longitudinally divided ECC duct is opened, the longitudinally divided ECC duct is provided with an outlet guide, which is configured to be positioned near below the lower end of the longitudinally divided ECC duct and the outlet guide is configured to change a direction of backflow when sudden backflow is generated from a core of the nuclear reactor toward the lower end of the longitudinally divided ECC duct, and the outlet guide protrudes from the surface of the core barrel and reduces reversal flow resistance, which is generated when a high-speed backward flow generated before the emergency core cooling water is injected into the nuclear reactor through the longitudinally divided ECC duct.

7. The longitudinally divided ECC duct according to claim 1, wherein the emergency core cooling water inlet and the direct vessel injection nozzle are not mechanically connected to each other.

8. The longitudinally divided ECC duct according to claim 7, wherein a cross sectional area of the inlet of the longitudinally divided ECC duct is larger than a cross sectional area of the direct vessel injection nozzle.

* * * * *